(No Model.) 2 Sheets—Sheet 1.
J. DAHN.
MACHINE FOR SPRINKLING.
No. 307,103. Patented Oct. 28, 1884.
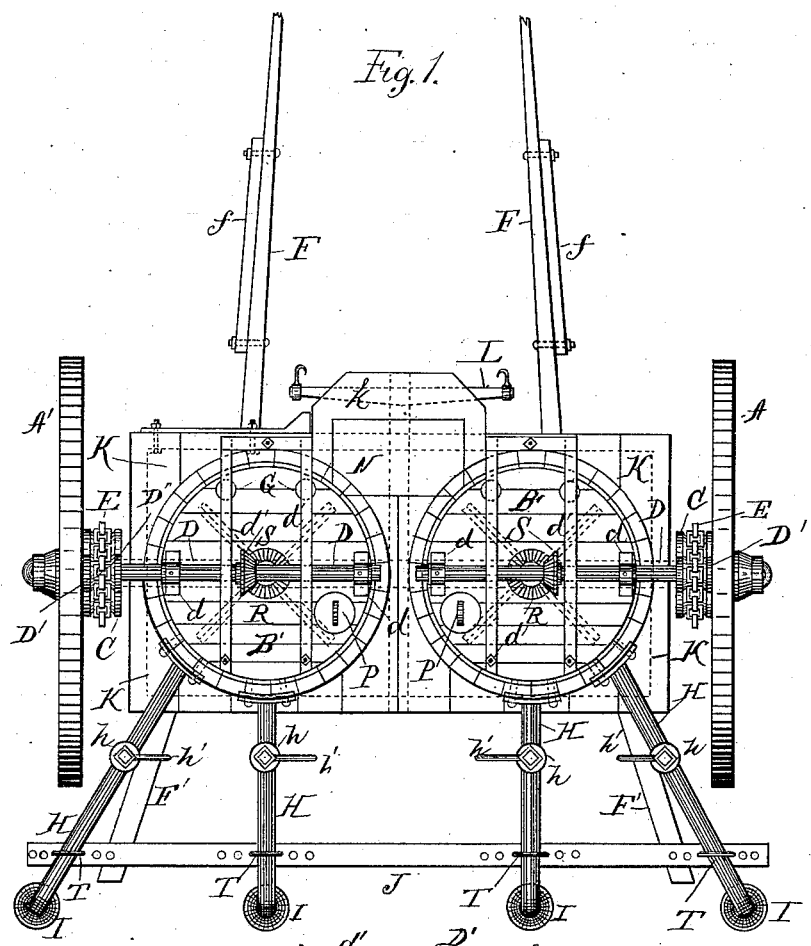
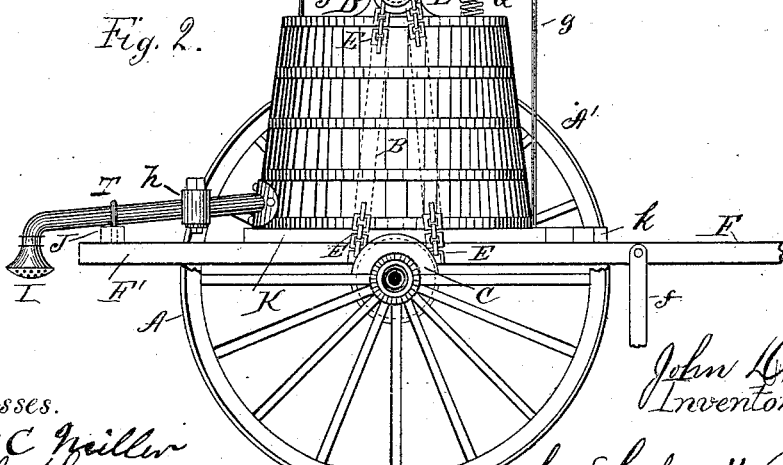
Witnesses.
John C. Miller
A. L. Keyser
John Dahn
Inventor
by Lafayette Bingham
Attorney (No Model.) 2 Sheets—Sheet 2.
J. DAHN.
MACHINE FOR SPRINKLING.
No. 307,103. Patented Oct. 28, 1884.
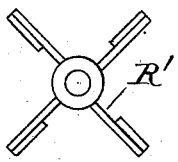
Fig. 6.
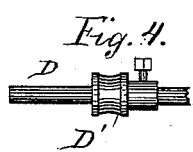
Fig. 4.
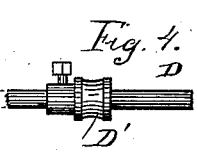
Fig. 4.
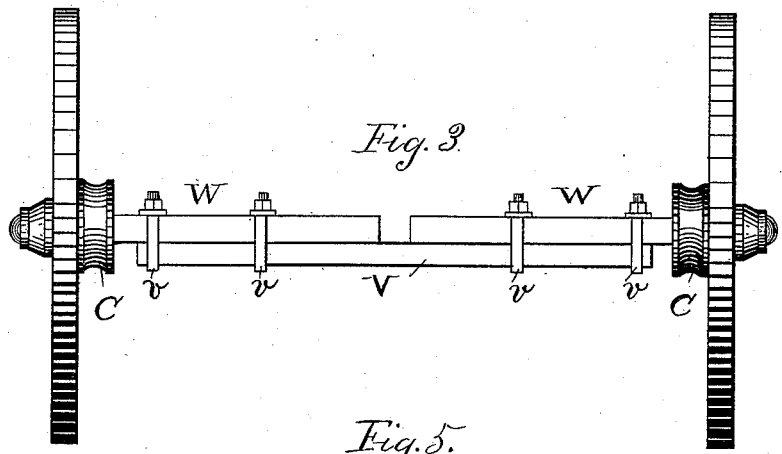
Fig. 3.
Fig. 5.
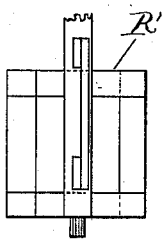
Witnesses.
John C. Miller
A. L. Keyser
John Dahn
Inventor
by Lafayette Bingham
Attorney.
N. PETERS. Photo-Lithographer, Washington, D. C.

UNITED STATES PATENT OFFICE.

JOHN DAHN, OF EAST TOLEDO, OHIO.

MACHINE FOR SPRINKLING.

SPECIFICATION forming part of Letters Patent No. 307,103, dated October 28, 1884.

Application filed January 29, 1884. (No model.)

*To all whom it may concern:*

Be it known that I, JOHN DAHN, of East Toledo, in the county of Lucas and State of Ohio, have invented certain new and useful Improvements in Farm and Garden Watering Machine and Potato-Bug Destroyer and Liquid Fertilizer Combined; and I do hereby declare that the following is a full, clear, and exact description of the invention, which will enable others skilled in the art to which it appertains to make and use the same, reference being had to the accompanying drawings, and to letters of reference marked thereon, which form a part of this specification.

The objects of this improvement is to provide suitable means for protecting growing potatoes from the ravages of potato-bugs and destroying them in large quantities by simultaneously sprinkling several rows of the plants with chemically-prepared water, and that can be used for applying liquid manure to land and growing crops of different kinds, and also for watering crops when not sufficiently supplied by rain. These results are attainable by the mechanism illustrated in the drawings herewith filed as part hereof, in which the same letters of reference denote the same parts in all the views.

Figure 1 is a plan view of my improvement. Fig. 2 is a side elevation, partly in section. Fig. 3 is a side elevation of the wheels and axle detached, showing arrangement of the axle for setting the wheels in or out. Fig. 4 is a section showing mode of construction for small pulley when the adjustable axle is used. Fig. 5 is a side elevation of the agitator detached from the tank. Fig. 6 is a top view of the same.

A and A' are transporting-wheels geared to drive the liquid-agitators within the tanks B B by means of grooved pulleys C C, affixed to the drive-wheels A A', and pulleys D D, affixed to the shafting D D, which is provided with bevel-gearing S in position to engage with corresponding gearing, R, secured to the upper ends of the shafting of the agitators R'.

E E represent chain belts connecting the pulleys C C on the drive-wheels and the pulleys D' D' on the shafting D D, which turn in bearings d, affixed to the tops or lids of the tanks, the said parts being referred to by letters B' B'.

F F represent ordinary cart-shafting provided with adjustable standards f, for propping the shafting from the ground as occasion may require.

K K is a platform secured to the wheel-axles W W', which are made adjustable in or out on the bar V, and secured in position by means of the stirrups v, as shown in Fig. 3.

To the platforms K are secured rods g g', which pass through beams d' above the tanks B B, for the purpose of furnishing bearings for tension-springs G, as seen in Fig. 2, the object thereof being to hold the tank-lids B' B' securely in position.

Projecting from the tank-platform K, and rearward thereto, are beams F' F', to which is transversely secured the beam J, for supporting the lead pipes H, connecting with the tanks B B, and provided intermediately with cocks h, having handles h', for controlling the flow of the chemicalized fluid carried in the tanks.

I I represent flared and perforated nozzles or sprinklers at the ends of the pipes H.

The transverse beam J is provided with a series of perforations adjoining the pipes, which may be moved out or in as occasion may require, and secured in position by means of the stirrups T and said perforations, as shown.

L represents a single-tree attached to the cart in the ordinary way.

N is a box for carrying a supply of paris-green when the appliance is used as a potato-bug exterminator or fertilizer matter when used for applying the same in a liquid state.

P P represent lids to apertures in the tank-lids B' B', which are removed when necessary to supply the tanks with water, or the water with paris-green or fertilizing matter.

k is a projection of platform K.

When the tanks are supplied with water, a suitable amount or paris-green is applied thereto, and the motion of the drive-wheels A A' will cause motion of the agitators R' through the shafting D D, and the chemical matter will be thoroughly blended with the liquid, and in such state simultaneously applied to various rows of potato-vines through the pipes H in a rapid and efficient manner, and the growing crop watered in addition to the potato-bugs being destroyed.

By means of the adjustable axle the wheels may be set to suit the distance between the rows of the plants, and thus made to clear the same. The pipes may also be adjusted as circumstances may require.

I am aware that watering and sprinkling machines have heretofore been in use having tanks provided with liquid-agitators operated by means of belts connecting with pulley secured to the transporting-wheels, and possessing other features of construction similar to some of the parts made use of in my machine, as illustrated in Letters Patent No. 200,376, to William T. Daughtrey, bearing date February 19, 1878, and to Letters Patent No. 62,006, February 12, 1867, to Clark, which I, therefore, do not claim as broadly new.

Having explained the construction and operation of my improvement, what I claim as new, and desire to secure by Letters Patent, is—

1. The combination of the tanks B', having agitators R', the shafting D D, provided with adjustable pulleys D' D' and bevel-gears S, the chain E, and transporting-wheels A, having pulley C, all constructed and arranged to operate as specified, for the purpose set forth.

2. The combination of the beams $d$, rods $g$ $g$, tension-springs G, arranged to operate as specified, for the purpose set forth.

3. The transverse beams J, secured to the rear extensions of the platform K, and provided with a series of perforations and stirrups, T, in combination with the discharge-conduits H and tanks B, substantially as specified, for the purpose set forth.

In testimony that I claim the foregoing as my own I affix my signature in presence of two witnesses.

JOHN DAHN.

Witnesses:
ORSON SAGE,
C. A. CHOLLETT.